Nov. 13, 1962   R. O. KUTSCHE   3,063,424
FLUID ACTUATOR

Filed Aug. 31, 1960   2 Sheets-Sheet 1

INVENTOR.
ROBERT O. KUTSCHE
BY Ernest L Brown
ATTORNEY

Nov. 13, 1962   R. O. KUTSCHE   3,063,424
FLUID ACTUATOR

Filed Aug. 31, 1960   2 Sheets-Sheet 2

INVENTOR.
ROBERT O. KUTSCHE
BY *Ernest L Brown*
ATTORNEY

United States Patent Office 3,063,424
Patented Nov. 13, 1962

3,063,424
FLUID ACTUATOR
Robert O. Kutsche, Grand Rapids, Mich., assignor to Lear Siegler, Inc., a corporation of Delaware
Filed Aug. 31, 1960, Ser. No. 53,216
6 Claims. (Cl. 121—40)

This invention pertains to a fluid actuator which is adapted to be controlled by pneumatic or hydraulic fluid. More particularly, this invention pertains to a pneumatic or hydraulic fluid actuator together with a pneumatically or hydraulically actuated caging mechanism.

Although the device of this invention may be utilized either as a pneumatic or hydraulic device, it is described herein as a hydraulic device.

The device of this invention falls generally into a class of actuators which are described as linear actuators. By the word "linear" is meant that the actuating device operates in a straight line.

Linear actuators of the piston type are usually controlled by hydraulic or pneumatic amplifier such as—for example—a pneumatic or hydraulic servo valve.

It is frequently desirable to lock or cage the actuator to prevent its being controlled by the servo valve. For example, if the servo valve or its controlling amplifiers are defective it is desirable to cage the actuator. Further, the case of the actuator may be connected to a mechanical linkage (not shown or described herein) whereby if the sliding link is caged or rigidly connected to the case, motion of the case may be transmitted directly to the sliding linkage. For example, in an emergency the sliding mechanism could be caged to the case and the operator could then actuate the sliding mechanism by mechanically moving the case by mechanical levers and the like.

It is therefore an object to this invention to provide a linear actuator which is pneumatically or hydraulically controlled together with a caging mechanism, said caging mechanism being pneumatically or hydraulically controlled.

It is another object of this invention to provide a pneumatically or hydraulically controlled caging mechanism for a linear actuator.

It is a more particular object of this invention to provide a pneumatically or hydraulically operated sliding piston in a housing, spring biased means for centering said piston, and a second spring biased means adapted mechanically to engage said piston and said housing when said piston is in its central caged position.

Figure 1:
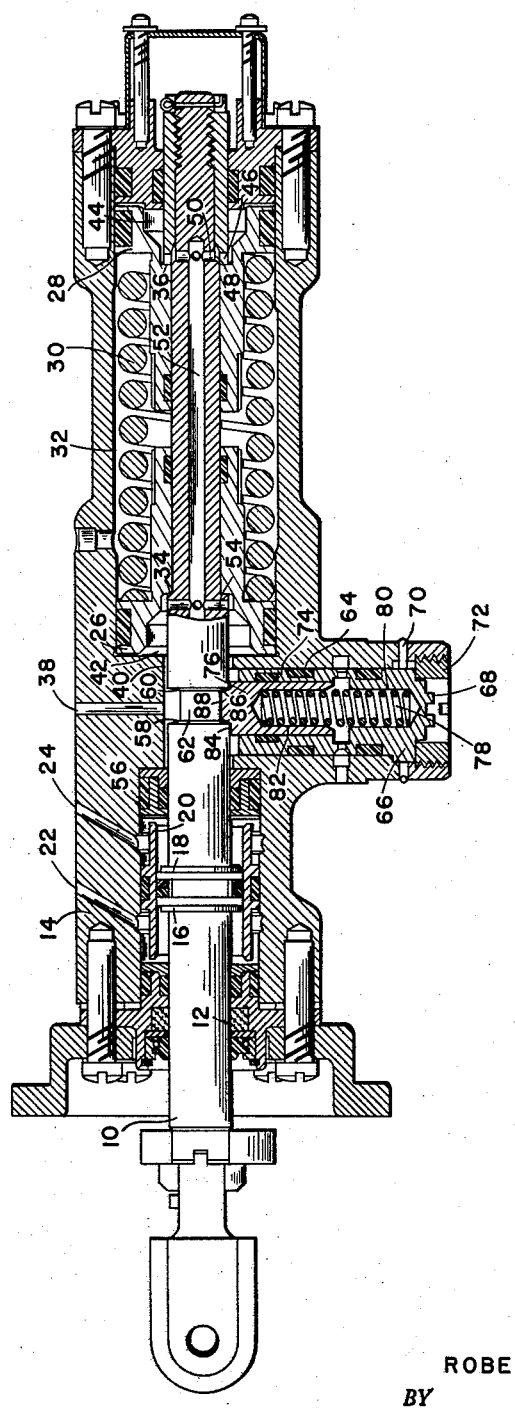
Figure 2:
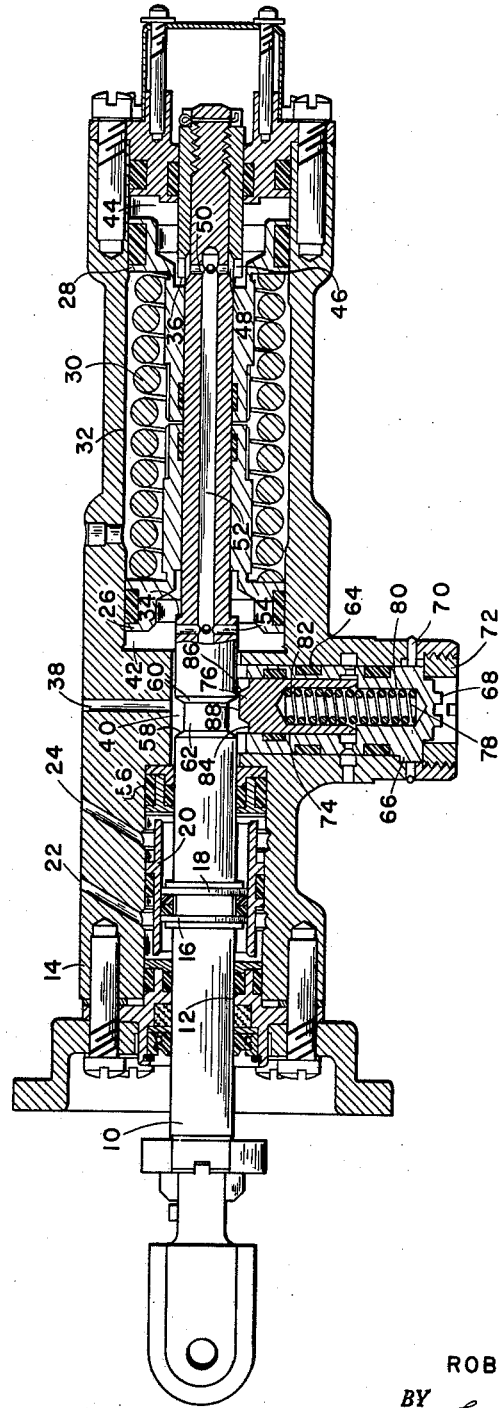

Other objects will become apparent from the following description taken in connection with the accompanying drawings in which:

FIGURE 1 is a view of the device of this invention, partially in section and partially in profile with the caging mechanism of this invention engaging the piston thereof; and FIGURE 2 is a view, partially in section and partially in profile, of the device of this invention with the caging mechanism thereof disengaged from the piston.

In the drawings, piston 10 is positioned to slide in a bore 12 of housing 14 and to extend externally of housing 14. Piston flanges 16 and 18 are rigidly connected to piston 10 in the region of piston cylinder 20. Fluid ports 22 and 24 are positioned to introduce fluid into cylinder 20 on opposing sides of piston flanges 16 and 18 in response to—for example—the control of servo valve (not shown).

Centering piston sleeves 26 and 28 are oppositely biased by spring means 30 in auxiliary bore 32 and are adapted to slide along piston 10 between stops 34 and 36. Spring means 30 is preferably a spiral compression spring whose axis is substantially parallel to the axis of piston 12.

External fluid port 38 is connected through fluid chamber 40 to fluid chamber 42 adjacent piston 26. Fluid chamber 44 adjacent piston 28 is fluid-connected through a plurality of passages such as—for example—passage 46, annular chamber 48, a plurality of passages such as—for example—passages 50, and 52, and a plurality of passages such as—for example—passage 54 to fluid chamber 42.

The region interior to cylinder 20 is separated from the region interior to chamber 40 by sealing means 56 to prevent changes in fluid pressure on one side of the sealing means 56 from affecting the pressure on the other side of sealing means 56.

In the region of chamber 40, piston 10 has an annular groove defined by shoulders 58 and 60 and by cylindrical portion 62 of reduced diameter.

In the region of fluid chamber 40 and the groove defined by surfaces 58, 60 and 62 of piston 10 is a substantially cylindrical bore 64 in housing 14. The axis of bore 64 is perpendicular to the axis of piston 10. A rotatable piston-receiving cylinder 66, adapted to be rotated by screwdriver-receiving member 68 is inserted in bore 64 and kept from rotating by G-ring 70. A backup screw 72 is positioned in the end of bore 64 to reenforce member 66 against the stresses of internal fluid pressure. A piston cylinder 74 forms part of the piston receiving cylinders 66 and has an eccentric bore in the interior thereof which is coaxial with an eccentric bore in the base portion 66 of the piston receiving cylinder. Piston 76 is positioned to slide in the bore of cylinder portion 74. Piston 76 is biased toward piston 10 by spring means 78 which is positioned between a pair of spring seats 80 and 82, spring seat 80 being positioned at the end of bore 74 and spring seat 82 being positioned substantially coaxially within that end of piston 76 which is directed away from piston 10.

On that end of piston 76 which is adjacent piston 10 is an annular shoulder 84, a conical surface 86, and a substantially flat surface 88. Surfaces 84, 86 and 88 are adapted to engage the annular groove formed by the external surface of piston 10, and surfaces 58, 60 and 62 of piston 10.

In operation, when on fluid pressure is applied to conduit 38, spring 30 biases piston members 26 and 28 in opposite directions. Piston member 26 engages piston 10 at shoulder 34 and piston member 28 engages piston 10 at shoulder 36. By making spring 30 very strong, piston 10 is now centered and substantially caged to resist changes in fluid pressure which appear at ports 22 and 24.

Surfaces 84, 86 and 88 of piston 76 engage the exterior surface of piston 10 and surfaces 58, 60 and 62 of piston 10 mechanically to lock piston 10 into engagement with housing 14. It is to be stressed that, even in the absence of piston 76, springs 30 may be adjusted to have sufficient strength to cage piston 10. However, the position of caging of piston 10 can be more precisely fixed by utilizing piston 76. The position along the axis of piston 10 of piston 76 is slightly adjustable due to the eccentricity of bore 74 within cylinder-carrying means 66. By applying a screwdriver (or the like) to cylinder-carrying means 66 and rotating about its axis, the position of bore 74 and piston 76 is varied along the axis of piston 10.

When fluid pressure is applied to port 38, the pressure is communicated through fluid chamber 40 to fluid chamber 42, thence through conduits such as conduit 54, through conduit 52, through passages such as passage 46, through annular chamber 48, and passages such as passage 46 to fluid chamber 48. By adjusting the piston areas and spring constants, the first action to occur as the pressure increases in chamber 40 is to disengage piston 76 from piston 10. Piston 76 disengages from piston 10 as shown in FIGURE 2. As the pressure in chamber 40, hence in chambers 42 and 44, increases pistons 26 and 28 are forced against the urge of spring 30, into the position shown in FIGURE 2, to uncage piston 10. Piston 10 is then free to move in response to pressure differentials across the surfaces of piston flanges 16 and 18 caused by pressure differentials in conduits 22 and 24. In FIGURE 2 piston 10 is shown displaced from its caged position.

When the pressure decreases in chamber 40, spring 30 engages piston 12 to center piston 12 into the position of FIGURE 1. As the pressure in chamber 40 further decreases, piston 76 is urged into engagement with piston 12 thereby to cage piston 12.

Thus the device of this invention is a caging mechanism for a linear fluid actuator. More particularly, the device of this invention is adapted to center a linear actuator into a predetermined position and to cage the actuator into its centered position by mechanically connecting the piston to its housing. This piston and housing are uncaged and released by the application of fluid pressure through an auxiliary hydraulic system.

Although the device of this invention has been particularly described above it is not intended that the invention should be limited by said description but only in accordance with the spirit and scope of the appended claims.

I claim:

1. In combination: a linear actuator housing, including a piston cylinder; a piston, positioned to move in said cylinder and extending externally of said housing; means for applying fluid pressure to said piston to position said piston in said cylinder; spring means biased to engage and cage said piston; and fluid pressure means at both ends of said spring means responsive to the application of fluid pressure to simultaneously compress said spring means from both ends and thereby disengage said spring means from said piston when fluid pressure is applied.

2. A device as recited in claim 1 in which said spring means comprises a helical compression spring concentric and external to said piston; and wherein said fluid pressure means comprise a pair of centering piston sleeves coaxial with said piston and mounted for slidable motion relative to said piston, one of which said piston sleeves positioned to engage opposing ends of said spring means so that when fluid pressure is applied to said piston sleeves said spring means is simultaneously compressed from both ends.

3. A device as recited in claim 1 and further comprising: a groove in said first named piston; a second piston adapted to engage said groove and whose axis of motion is normal to the axis of motion of said first named piston; second spring means adapated to bias said second piston into engagement with said groove; and means for adjusting the position of said last named piston relative to said housing to determine the caging position of said first mentioned piston.

4. A device as recited in claim 3 and further comprising means for locking the caging position of said last named piston relative to said housing.

5. In combination: a linear actuator, including a housing and a first piston adapted to slide in said housing; a pair of piston sleeves coaxial with said piston and mounted for slidable motion relative to said piston; first spring means intermediate said piston sleeves biased to engage said piston to cage said piston in a predetermined position; second piston means adapted to slide relative to said housing along an axis normal to the axis of said first piston, including second spring means adapted to bias said second piston into engagement with said first piston to cage said first piston to prevent movement thereof relative to said housing; and pressure fluid conduit means wherethrough the flow of pressure fluid into said housing acts first to disengage said second piston from said first piston then to simultaneously actuate said pair of piston sleeves to move toward each other and thereby compress said first spring means against its urge to thereby uncage said first piston.

6. In combination: an actuator housing; a first bore in said housing, adapted to receive a first piston, one end of said bore being enlarged and adapted to receive a spiral compression spring; a second bore at right angles to said first bore; a first piston positioned to slide in said first bore, including piston flanges rigidly connected to said piston; means in said housing for introducing fluid pressure to opposing sides of said piston flanges; a spiral compression first spring positioned around said first piston and substantially coaxial therewith in the enlarged region of said first bore; a pair of stops on said piston adjacent opposing ends of said spring; a pair of centering piston sleeves, one each of said piston sleeves engaging opposite ends of said first spring and adapted to slide along said first piston between said stops and to engage said stops in response to the expansion of said first spring; means for simultaneously applying fluid pressure to said centering piston sleeves whereupon said piston sleeves are caused to move toward each other to compress said first spring; an annular groove in said first piston, axially positioned upon said first piston to be adjacent said second bore when said first spring expands causing said piston sleeves to engage said stops on said first piston; a rotatable piston-receiving cylinder having a bore whose axis is eccentric to and parallel to the axis of said piston receiving cylinder, positioned in said second bore; a second piston positioned to slide in the bore of said piston-receiving cylinder; second spring means adapted to bias said second piston toward said first piston; and fluid pressure conduit means wherethrough the flow of fluid under pressure into the bore of said piston-receiving cylinder acts to force said second piston against the urge of said second spring; means for locking the position of said piston-receiving cylinder relative to said housing; and screw means adapted to back-up and reenforce said piston-receiving cylinder.

References Cited in the file of this patent

UNITED STATES PATENTS

| | | |
|---|---|---|
| 2,205,346 | Clench | June 18, 1940 |
| 2,342,812 | Martinson | Feb. 29, 1944 |
| 2,393,962 | Ashton et al. | Feb. 5, 1946 |
| 2,547,309 | Elmer et al. | Apr. 3, 1951 |
| 2,632,425 | Grover | Mar. 24, 1953 |